US008969825B2

(12) United States Patent
Greshilov et al.

(10) Patent No.: US 8,969,825 B2
(45) Date of Patent: Mar. 3, 2015

(54) METHOD FOR IDENTIFYING A NUCLEAR EXPLOSION BASED ON KRYPTON AND XENON ISOTOPES

(75) Inventors: Anatoly Antonovich Greshilov, mkr. Klyzama (RU); Aleksey Leonidovich Lebedev, Ugransky r-n (RU)

(73) Assignees: Federal State Budgetary Institution<Federal Agency for Legal Protection of Military, Special and Dual Use Intellectual Activity Results>(FSBI<FALPIAR>), Moscow (RU); Bauman Moscow State Technical University (BMSTU), Moscow (RU)

( * ) Notice: Subject to any disclaimer, the term of this patent is extended or adjusted under 35 U.S.C. 154(b) by 156 days.

(21) Appl. No.: 13/519,330

(22) PCT Filed: Dec. 24, 2010

(86) PCT No.: PCT/RU2010/000782
§ 371 (c)(1),
(2), (4) Date: Jun. 27, 2012

(87) PCT Pub. No.: WO2011/081566
PCT Pub. Date: Jul. 7, 2011

(65) Prior Publication Data
US 2013/0001431 A1 Jan. 3, 2013

(30) Foreign Application Priority Data
Dec. 28, 2009 (RU) .................... 2009148446

(51) Int. Cl.
*G01T 7/00* (2006.01)
(52) U.S. Cl.
CPC ........................ *G01T 7/00* (2013.01)
USPC ............................................ 250/395

(58) Field of Classification Search
CPC ............ G01T 7/00; G09B 9/08; G09B 9/085; G09B 9/12; B21B 27/00; B22F 3/18; B22F 5/12; B23K 26/0066; B23K 26/0093; B23K 26/38; B23K 35/40; B23P 25/006; B24C 1/00; B24C 1/045; B24C 7/0007; B24C 9/00; B41F 35/06; B41P 2235/23; B41P 2235/40; B64G 1/28; F16F 15/02; F42B 10/14; F42B 12/24; F42B 12/32; G01N 23/06; G01P 13/025; G01P 1/02; G01P 5/165; G01S 17/00; G02B 7/32; G03B 13/20; G03B 15/03; G03B 35/08; H04N 13/0253
USPC ............................................... 250/395, 336.1
See application file for complete search history.

(56) References Cited

U.S. PATENT DOCUMENTS
4,320,298 A    3/1982  Buford, Jr. et al.
4,483,817 A    11/1984 Evans et al.
6,567,498 B1   5/2003  Troxler et al.

FOREIGN PATENT DOCUMENTS
RU  2 068 571 C1  10/1996
RU  2 377 597 C2  12/2009

OTHER PUBLICATIONS
A.A. Greshilov et al. Algoritm identifikatsii istochnikov radioaktivnikh blagorodnykh gazov, Vestnik MGTU im, N. E. Bauman. Ser "Estestvennye nauki", 2003, N.2, p. 3-19.
Sagdeyev, R. Z. et al. "Problems of Monitoring Sea-Based Cruise Missles with Nuclear Warheads." Preprinted by IKI of the USSR AS, Pr-1373.-M., 1988.
PCT International Preliminary Report on Patentability, dated Jul. 4, 2012, Five (5) page.

*Primary Examiner* — Mark R Gaworecki
(74) *Attorney, Agent, or Firm* — Nath, Goldberg & Meyer; Jerald L. Meyer; Sanjana Mangalagiri

(57) ABSTRACT

The invention pertains to the field of nuclear physics and can be used in system for identifying nuclear explosions based on the measured activities in the atmosphere of naturally-occurring radioactive gases (NORG). The technical result is an increase in the determination efficiency and in the reliability of punctual estimations of deposits from various types of fission in the global activity for each krypton and xenon isotope.

2 Claims, 4 Drawing Sheets

METHOD FOR IDENTIFYING A NUCLEAR EXPLOSION BASED ON KRYPTON AND XENON ISOTOPES

FIELD OF THE INVENTION

The invention relates to nuclear physics and may be used in systems for identifying radioactivity in the atmosphere.

PRIOR ART

The identification of nuclear explosions based on isotopes of radioactive noble gases (RNG) takes place in the process of monitoring radioactive conditions for the purpose of monitoring the compliance with the Comprehensive Nuclear-Test-Ban Treaty (CTBT).

A method for distantly detecting nuclear material is known, which comprises irradiating an intercepted object with an electron beam and registering neutrons radiated from the object (U.S. Pat. No. 4,320,298, 1982).

Disadvantages of the said method are its non-applicability in the atmospheric conditions and its non-applicability for detecting objects that do not contain deuterium.

Methods for distantly detecting nuclear materials are known, which comprise irradiating an intercepted object with a neutron beam and registering neutrons or gamma-rays radiated from the object (SU Inventor's Certificate #439740; SU Inventor's Certificate #1349478; U.S. Pat. No. 4,483,817).

A disadvantage of these methods are their non-applicability in the conditions where for some or other reasons external radiation effect on an intercepted object is prohibitive.

A method for distantly detecting nuclear materials is known, which comprises detecting gamma rays intensity in the energy range from 0.1 to 2.0 MeV near an intercepted object (Sagdeyev, R. Z. et al. Problems of Monitoring sea-based cruise missiles with nuclear warheads. Preprinted by IKI of the USSR AS, Pr-1373.-M., 1988.).

A disadvantage of this method is the possibility of false detection of nuclear material, since radiation with such energy may be also created by non-explosive objects containing radioactive materials.

Methods for identifying nuclear explosions by radioactive isotopes of krypton and xenon are known.

A method for identifying nuclear explosions by radioactive isotopes of krypton and xenon (SU Inventor's Certificate #366771) is known. The mode of measuring RNG activity in this method is as follows: a sample is taken in the atmosphere (after an event), which is studied for some time. During this time the krypton and xenon isotopes activity is measured with a single-crystal scintillation gamma spectrometer NaJ(Tl).

Thus measured activities of krypton and xenon isotopes are used for forming a system of linear algebraic equations (SLAB) relative to unknown contributions of RNG sources to total activity of krypton and xenon isotopes.

The equation system is solved with the use of least-squares method (LSM).

The closest as to the technical essence is a method that enables to eliminate some of the disadvantages of the above method, i.e., to take into account the matrix element errors in an equation system to be solved and ensure obtaining of a stable solution with the use of the regularization method by A. N. Tikhonov (Greshilov A. A., Tetjukhin A. A. "An Algorithm for Identifying Sources of Radioactive Noble Gases". Bulletin of MGTU Named After N. E. Bauman. Natural Sciences Series, 2003. No. 2, p. 3-19.)

The known method for identifying nuclear explosions by radioactive krypton and xenon isotopes comprises:

1. Measuring activities $\tilde{A}_i(t)$ of separate krypton and xenon isotopes in the atmosphere (t is measurement time), where $i=\overline{1,n}$, n is a number of measured isotopes.

2. Determining a time interval $[t_H, t_K]$ in which separation occurs, for different types of fissionable materials (a fission type is understood as one of the fission variants of heavy nuclei of $U^{235}$, $U^{238}$, $PU^{239}$ by neutrons of the fission spectrum or neutrons with energy of 14 MeV) over activity relations of krypton and xenon isotopes, which are built with and without due regard to separation;

3. Setting time grid with $\Delta t$ spacing on the $[t_H, t_K]$ interval;

4. Forming and memorizing two-dimensional signal $\{a_{ij}(t_q, t)\}$, $i=\overline{1,n}$, $j=\overline{1,m}$ of specific activities of krypton and xenon isotopes for each grid node $t_q$ in which lines correspond to particular isotopes and columns to a particular fission type; n is a number of isotopes studied; m is a number of fission types studied; t is time of sample measuring; $t_q$ is supposed separation time;

5. Regarding measured activity values $A_i$ and elements of the two-dimensional signal $\{a_{ij}(t_q,t)\}$ as statistically independent quantities distributed according to the normal law with root-mean-square deviations $\sigma(A_i(t))$ and $\sigma(a_{ij}(t_q,t))$, respectively, a regular signal is formed at the set time $t_q$:

$$F_l = \frac{1}{2}\sum_{i=1}^{n}\left(\frac{\left(\tilde{A}_i(t) - \sum_{j=1}^{m} a_{ij}^{true}(t_q,t)\cdot(\rho N_j)\right)^2}{\sigma^2(\tilde{A}_i(t))} + \sum_{j=1}^{m}\frac{(a_{ij}(t_q,t) - a_{ij}^{true}(t_q,t))^2}{\sigma^2(a_{ij}(t_q,t))}\right),$$

where:

$(\rho N_j)$, $j=\overline{1,m}$ $a_{ij}^{true}(t_q,t)$ are contributions of radioactivity sources to a total activity;

$a_{ij}(t_q,t)$ are unknown true values of specific activity;

$a_{ij}(t_q,t)$ are specific activities calculated over independent and cumulative elements, which have errors, of radioactive transformation isobaric chains (RTIC);

l is iteration number for search of estimates for $\widehat{\rho N_j}$ and $\hat{a}_{ij}^{true}(t_q,t)$.

6. Setting the numbers of $\gamma 1$, $\gamma 2$ that characterize the accuracy of estimates of $\widehat{\rho N_j}$ and $\hat{a}_{ij}^{true}(t_q,t)$.

7. Finding iteratively a minimum signal F1 from $\widehat{\rho N_j}$ $\widehat{\rho N_j}$ and $\hat{a}_{ij}^{true}(t_q,t)$ by using the regularization by A. N. Tikhonov and complying with the limitations $|a_{ij}(t_q,t) - \hat{a}_{ij}^{true}(t_q,t)| \geq 3\sigma(a_{ij}(t_q,t))$, $i=1, 2, \ldots, n$, $j=1, 2, \ldots m$, until the following conditions are met:

$$\left\|\frac{(\widehat{\rho N_j})_l - (\widehat{\rho N_j})_{l-1}}{(\widehat{\rho N_j})_l}\right\| < \gamma_1,$$

$$\left|\frac{F_l - F_{l-1}}{F_l}\right| < \gamma_2,$$

where the index (l-1) is for the value obtained in the preceding iteration.

8. Estimate covariance matrix is determined by the relation $$D_{ij} = \left(-\frac{\partial^2 F_l}{\partial(\widehat{\rho N_i})\partial(\widehat{\rho N_j})}\right)^{-1}, i, j = 1, 2, \ldots, m.$$

But, this known method has the following disadvantages:
1) only the Tikhonov's regularization is used, which requires the regularization parameter to be determined additionally, and there is no unique method for finding it; the Tikhonov's regularization "smoothes" a solution, which may cause great errors in identification;
2) the considered equation system is overdefined, i.e., the number of lines of a two-dimensional signal $\{a_{i,j}(t_q,t)\}$ is greater than that of columns–the number of equations is greater than that of unknowns. A possibility of applying this approach in real situations, when radioactivity of krypton and xenon isotopes is measured in several days after the event, and when the number of unknown $\rho N_j$ (contributions from various sources) is greater than the number of isotopes to be measured, i.e., the number of $\tilde{A}_i(t)$ quantities, has not been studied.

Thus, the known solution does not ensure identification of a nuclear explosion in the most probable case, when activity of 2-4 isotopes is measured, and samples are taken in 5-6 days after a corresponding event.

The said disadvantages, apparently, will not enable to apply this method in real conditions due to its low practical efficiency.

SUMMARY OF THE CLAIMED INVENTION

The technical effect of the claimed method is improvement in reliable determination of a fact of a nuclear explosion made, the number of measured isotopes being less than a considered number of unknowns (fission types).

Efficiency of the claimed method is ensured due to:
1) simultaneous consideration of various supposed combinations of krypton and xenon isotope activity sources and various mechanisms of a nuclear explosion;
2) development and inclusion into the nuclear explosion identification method of a multi-criterion mathematical programming mechanism enabling to take into account all possible types of additional conditions (non-negativity of a solution, boundedness of solution) that a solution estimate should comply with, and elimination of the regularization parameter (by A. N. Tiknonov), clearly formalized procedures that have no definition;
3) combination of two types of $U^{235}$ fission by fission spectrum neutrons and by neutrons with energy of 14 MeV in a single fission type as well as two types of $Pu^{239}$ fission by fission spectrum neutrons and by neutrons with energy of 14 MeV in a single fission type by averaging independent and cumulative outputs of the RTIC elements.

The technical effect of the claimed invention is achieved by developing a method for identifying a nuclear explosion by radioactive isotopes of krypton and xenon, which is characterized by measuring, at the time t after an event, signals $A_i(t)$ describing a change in total activity of each isotope in the atmosphere near a measuring station, building relations between isotope activities and time without due regard to separation and relations between isotope activities which are drawn from measured points in reverse time for all considered fission types, determining a separation interval $[t_H, t_K]$, setting a time grid within that separation interval $[t_H, t_K]$, forming combinations of fission types, calculating, for each grid node $t_q$ within the separation interval and each combination, a two-dimensional signal A describing values of "specific" activities of each isotope, depending on separation time $t_q$, and measurement time t, and a potential source (of a fissionable material and neutron energy), setting mean square values $\sigma(A_i(t))$ for errors of measured signals $A_i(t)$ and errors $\sigma(a_{i,j}(t_q,t))$ of elements of a two-dimensional signal $\{a_{i,j}(t_q,t)\}$, setting quantities $\gamma_1, \gamma_2$ defining accuracy of calculations for signal estimations $\rho N_j$ and $J_2$ signal, identifying a nuclear explosion with the use of formation of a signal $J_1$ determining accuracy of a solution obtained from the sum of squares of difference between the signals $A_i(t)$ and products of lines of a two-dimensional signal $\{a_{i,j}(t_q,t)\}$ multiplied by values of signals $\rho N_j$ and the signal $J_2$ determining a type of the $\rho N_j$ signal, forming limitation signals and a target signal (target function) from the signals $J_1$ and $J_2$ in the set combinations, and finding, with the use of iteration process and with refining during each iteration, values of the $\{a_{i,j}(t_q,t)\}$ two-dimensional signal of the elements of the $\rho N_j$ signal, determination of point estimates of activity contributions from each fission type possible to total activity, selecting an optimal combination of fission types by a sum of discrepancy squares.

The method is also characterized by combination of two types of $U^{235}$ and $Pu^{239}$ fission by neutrons from different energy groups in a single fission type $\eta^{U^{235}}_H$, $\eta^{Pu^{239}}$, respectively, by summing with weights of independent and cumulative outputs of isobaric chain elements corresponding to different fission types, forming a two-dimensional grid according to weights $c_1$ and $c_2$, calculating specific activity for each pair of weight values $c1$, $c2$ of the two-dimensional signal elements $\{a_{i,j}(t_q,t\}_{cc}$, calculating, according to Item 1, signal estimates $(\rho Nj)_{cc}$, selecting an estimate $(\rho Nj)_{cc}$ for which the value of $$\sum_{i=1}^{n}\left(\tilde{A}_i(t) - \sum_{j=1}^{m}(a_{ij}^{true}(t_q, t))_{c_1 c_2}(\widehat{\rho N_j})_{c_1 c_2}\right)^2$$

is minimal.

$Kr^{83m}$, $Kr^{85m}$, $Kr^{85}$, $Kr^{88}$, $Xe^{131m}$, $Xe^{133m}$, $Xe^{133}$, $Xe^{135}$ are takes as individual krypton and xenon isotopes.

In order to establish a fact of nuclear explosion by a small number of measured isotopes, two types of $U^{235}$ fission (fission by fission spectrum neutrons and neutrons with energy of 14 MeV) are combined in a single fission type, and two types of $Pu^{239}$ fission (fission by fission spectrum neutrons and neutrons with energy of 14 MeV) are combined in a single fission type by means of averaging independent and cumulative outputs, as corresponding to the said fission types, of RTIC elements.

Activity contributions from individual sources $\widehat{\rho N_j}$ are evaluated by means of forming several target functions and using methods of multi-criterion mathematical programming, reducing a multi-criterion task to a single-criterion task with limitations, obtaining a solution to the said single-criterion task with limitations by iteration calculation procedures, determining a contribution of each source to total activity according to $\widehat{\rho N_j}$ values (number of fissions of j-type), i.e., identifying parameters of a nuclear explosion. A combination of RNG isotope sources, which gives a minimum value of the $F_l$ signal, is taken as true in the solution process.

Best embodiments of the method for identifying a nuclear explosion by radioactive isotopes of krypton and xenon.

The essence of the claimed invention is explained hereinbelow by means of its description and graphic materials, where:

Figure 1:
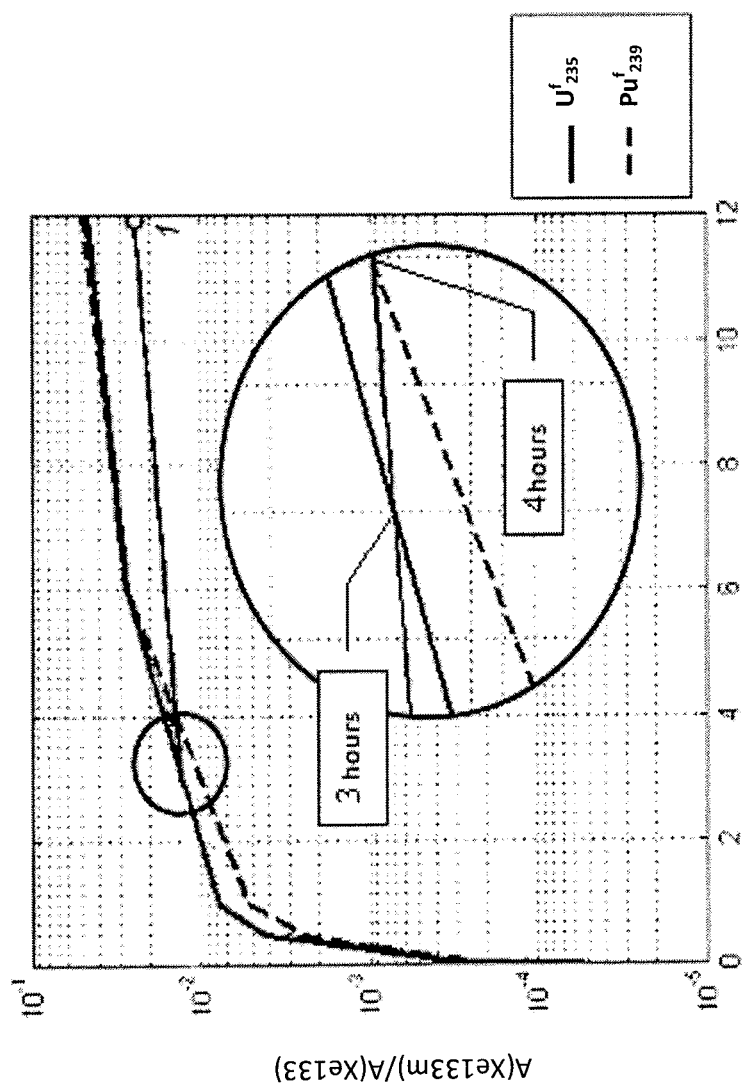
FIG. 1 shows a change in relative activity of isotopes A(Xe133m)/A(Xe133) for a case of fission of $U^f_{235}$ and $Pu^f_{239}$ without separation (solid line and dashed line, respectively) and with due regard to separation from preceding isotopes (line with markers), point 1 is a relation of measured isotope activities at the time t=12 hours.

For carrying out the method for identifying a nuclear explosion by radioactive isotopes of krypton and xenon it is necessary to determine the following parameters of nuclear explosion sources on the basis of RNG in the atmosphere:

contributions of each fission type (fissionable material and neutron energy $\widehat{\rho N}_j$, $j=\overline{1,m}$) to the total RNG activity measured in the atmosphere.

As a practically justified assumption for the claimed method, registered signals (of isotope activity) are considered as deterministic, subjected to additive interference, which parameter estimates should be defined.

At instant fission i-number isotope appears as a result of different fission types, and its measured activity $\tilde{A}_i(t)$ may be expressed as follows [3]:

$$\sum_{j=1}^{m} a_{ij}(\theta, \eta, \lambda, t, t_q)\rho N_j = \tilde{A}_i(t), i = 1, 2, \ldots, n, \quad (1)$$

where: $a_{ij}(\theta,\eta,\lambda,t,t_q)$ is activity of i-isotope at j-type of fission for one act of decay, which is calculated subject to separation at the time $t>t_q$, i.e., specific activity;

$\theta$ is vector of parameters characterizing separation of measured isotopes from preceding thereto;

$\eta$ is vector of independent outputs of isotopes (at j-type of fission);

$\lambda$ is vector of decay constants;

t is observation time;

$t_q$ is supposed separation time of separation of krypton and xenon isotopes from preceding isotopes along chains of radioactive transformations;

$\rho$ is proportion of i-isotope in a sample ($\rho$ value is usually unknown);

$N_j$ is number of fissions of j-type.

Until the time of separation $t_q$, specific activity $a_{nj}^{is\ q}(\theta, \eta, \lambda, t_q)$ is determined by the formula:

$$a_{nj}^{t_q}(\theta, \eta, \lambda, t_q) = \begin{cases} \eta_n \lambda_n \exp(-\lambda_n t_q) + \\ \sum_{p=1}^{p_{max}} \sum_{i_p=1}^{n_p-1} \eta_{i_p} \lambda_n \left[ \prod_{r_p=i_p}^{n_p-1} \gamma_{r_p} \lambda_{r_p} \sum_{s_p=i_p}^{n_p} \frac{\exp(-\lambda_{s_p} t_q)}{\prod_{\substack{q_p=i_p \\ q_p \ne s_p}}^{n_p} (\lambda_{q_p} - \lambda_{s_p})} \right] \end{cases}, \quad (2)$$

where:

$\eta_i$ is independent output of i-isotope;

$n_p$ is studied isotope number along p-branch;

n is maximum member from $\{n_p\}$;

$p_{max}$ is number of chain branches;

$(n_p-1)$ is number of isotopes preceding the studied one along p-branch of decay;

$\gamma_{r_p}$ is proportion of r-member of the chain, which is obtained from (r−1) along the p-chain;

$\lambda_{t_p}$, $\lambda_{r_p}$, $\lambda_{s_p}$, $\lambda_{q_p}$ are decay constants of isotopes having respective numbers $i_p$, $r_p$, $s_p$, $q_p$ along the p-branch, wherein $i_p \le r_p \le n_p-1$; $i_p \le s_p \le n_p$; $i_p \le q_p \le n_p$ and $q_p \ne s_p$;

$t_q$ is time when instant separation of studied isotope from preceding ones occurs, after which isotope decal goes exponentially with decay constant $\lambda_n$.

After the time of separation isotopes decay according to their decay constants $\lambda_i$:

$$a_{ij}(\theta,\eta,\lambda,t,t_q) = a_{ij}^{t_q}(\theta,\eta,\lambda,t_q)\exp(-\lambda_i(t-t_q)),$$
$$i=1,2,\ldots,n, j=1,2,\ldots,m, \quad (3)$$

where $a_{ij}^{t_q}(\theta, \eta, \lambda, t_q)$ is specific activity calculated according to formula (2) at the time $t_q$.

Equations of type (1) are formulated for each measured isotope of krypton and xenon; in the result, SLAE is formed $$\begin{bmatrix} a_{11}(t_q,t) & a_{12}(t_q,t) & \cdots & a_{1m}(t_q,t) \\ a_{21}(t_q,t) & a_{22}(t_q,t) & \cdots & a_{2m}(t_q,t) \\ \vdots & \vdots & \ddots & \vdots \\ a_{n1}(t_q,t) & a_{n2}(t_q,t) & \cdots & a_{nm}(t_q,t) \end{bmatrix} \cdot \begin{bmatrix} \rho N_1 \\ \rho N_2 \\ \vdots \\ \rho N_m \end{bmatrix} = \begin{bmatrix} \tilde{A}_1(t) \\ \tilde{A}_2(t) \\ \vdots \\ \tilde{A}_n(t) \end{bmatrix}, \quad (4)$$

wherein unknown contributions of radioactive sources $\rho N_j$ to total activity of krypton and xenon isotopes are to be defined.

The first step in solving the task of identifying RNG is to define separation time $t_q$ for krypton and xenon isotopes.

A time interval to which separation time belongs may be found by completing "building" relative isotope activities in different fission types "in reverse time" from the measurement time with no account taking of influence of isotopes preceding thereto and by determining intersections of lines drawn from experimental points and relative activities built with due regard to influence of preceding isotopes along the isotope decay chain.

FIG. 1 shows plots of relative activities for two xenon isotopes ($Xe^{133m}$, $Xe^{135}$), wherein the experimental point 1 corresponds to the time of measuring activities t=12 hours after an event. In order not to complicate the Figure, only "boundary" lines are shown, which correspond to $U_f^{235}$ and $Pu_f^{239}$ (instead of 6 possible fission types: $U_f^{235}$, $U_{14}^{235}$, $U_f^{238}$, $U_{14}^{238}$, $Pu_f^{239}$ and $Pu_{14}^{239}$).

As shown in FIG. 1, the separation time belongs to the interval from $t_H=3$ to $t_K=4$ hours after the event.

When setting a time grid within the interval $[t_H, t_K]$ and solving the system (4) for times $t_q$ corresponding to the grid nodes, the time $t_q^{min}$, for which a sum of squares of discrepancies of the system (4) is minimum, is taken as the separation time.

Figure 2:
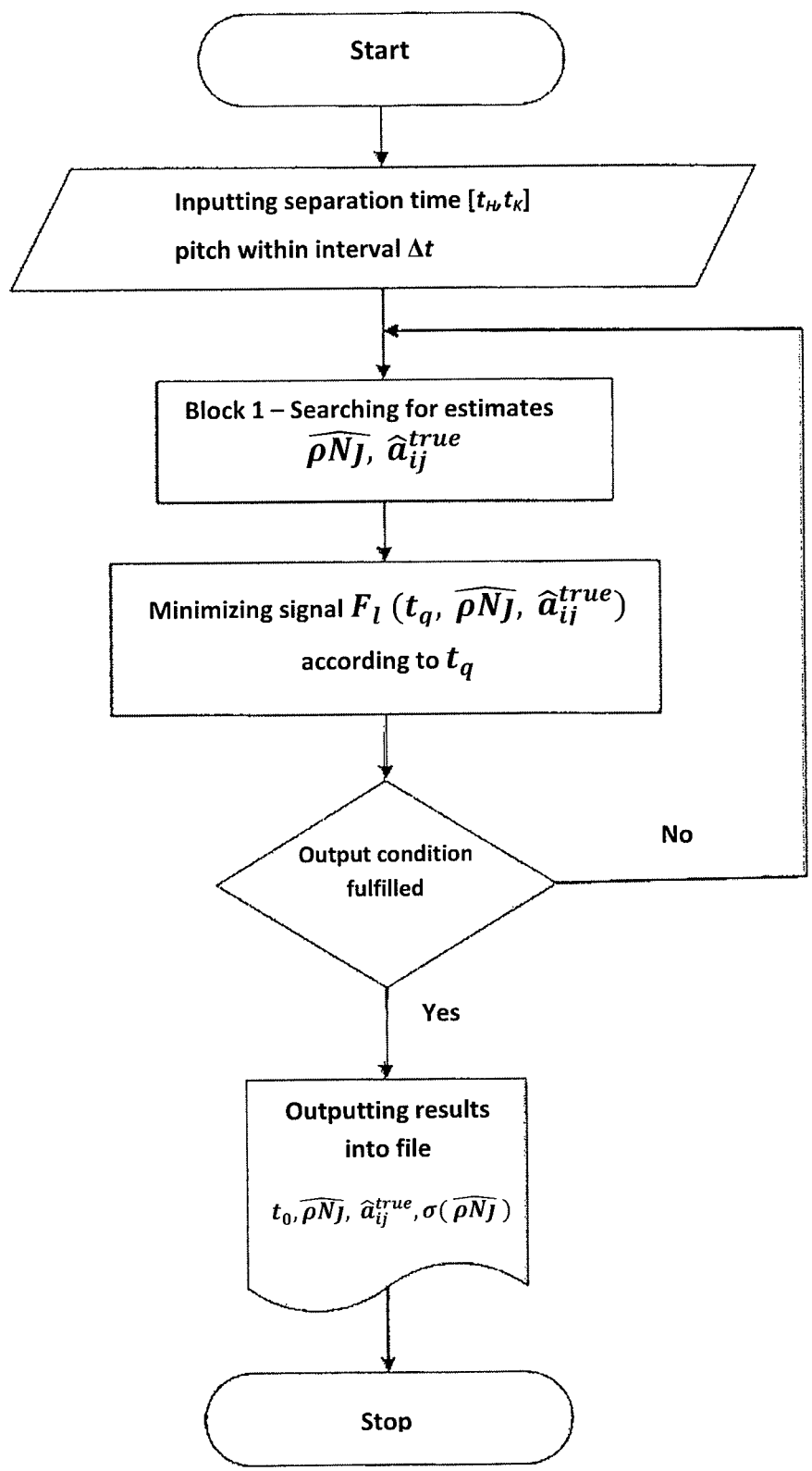
FIG. 2 shows a general block diagram of the algorithm used for obtaining estimates for separation time $\hat{t}_q$ and a solution $\widehat{\rho N}_j$.

The general algorithmic diagram enabling to find estimates $\hat{t}_q$, $\widehat{\rho N}_j$, $\hat{a}_{ij}^{true}(t_q,t)$ is shown in FIG. 2.

The second step in solving the task of identifying a nuclear explosion is to determine solution estimates $\widehat{\rho N}_j$ for each fixed separation time $t_q$.

At a given $t_q$ the system (4) is linear relative to unknown $\widehat{\rho N}_j$, $j=1, 2, \ldots$ m.

Since elements of a two-dimensional signal $A=\{a_{ij}(t_q,t)\}$ may not be calculated accurately (independent outputs are known with errors) and isotope activities $\tilde{A}(t)$ are also measured with errors, we can think that elements of the two-dimensional signal A and measured activities $\tilde{A}(t)$ are independent random quantities distributed according to the normal law with mathematical expectations equal to $q_{ij}^{true}(t_q, t)$ and $\tilde{A}_i^{true}(t)$ and variances equal to $\sigma^2(a_{ij}(t_q,t))$ and $\sigma^2(\tilde{A}_i(t))$, respectively:

$$a_{ij}(t_q,t) = a_{ij}^{true}(t_q,t) \pm \epsilon_{ij},$$

$$\tilde{A}_i(t) = \tilde{A}_i^{true}(t) \pm \delta_i, \quad (5)$$

where:

$a_{ij}^{true}(t_q,t)$, $\tilde{A}_i^{true}(t)$ are true values of specific and measured activities of isotopes (which are unknown to us;

$\epsilon_{ij}$ are errors in determining specific activities $a_{ij}(t_q,t)$;

$\delta_i$ are errors in measuring activities $\tilde{A}_i(t)$ of RNG in the atmosphere.

In order to take into account errors both in measured activities $\tilde{A}_i(t)$ and in elements of the two-dimensional signal $\{a_{ij}(t_q,t)\}$, the definition of orthogonal regression [4] is used, and, due to independence of random quantities $a_{ij}(t_q,t)$ and $\tilde{A}_i(t)$ the signal may be written as:

$$F_l = \frac{1}{2} \sum_{i=1}^{n} \left( \frac{\left(\tilde{A}_i(t) - \sum_{j=1}^{m} a_{ij}^{true}(t_q,t) \cdot (\rho N_j)\right)^2}{\sigma^2(\tilde{A}_i(t))} + \sum_{j=1}^{m} \frac{(a_{ij}(t_q,t) - a_{ij}^{true}(t_q,t))^2}{\sigma^2(a_{ij}(t_q,t))} \right), \quad (6)$$

where:

$(\rho N_j)$, $j=\overline{1,m}$ are contributions of radioactivity sources to total activity;

$a_{ij}^{true}(t_q,t)$ are unknown accurate values of specific activities which estimates are made more precise in the process of finding $\rho N_j$, $a_{ij}(t_q,t)$ are specific activities calculated according to the formulae (2)-(3) over independent and cumulative outputs, which have errors, of isobaric chain elements of radioactive transformations;

$\tilde{A}_i(t)$ are RNG measured in a sample.

The signal (6), apart from an unknown vector of contributions of radioactivity sources $\rho N_j$, $j=1, 2, \ldots, m$, comprises also unknown true values of calculated activities $a_{ij}^{true}(t_q,t)$, $i=1, 2, \ldots, n$, $j=1, 2, \ldots, m$, which estimates are to be found with the use of confluent analysis [3, 4].

The following conditions are to be met in the minimum point of the signal (6):

$$\left. \frac{\partial F_l}{\partial (\rho N_j)} \right|_{\rho N_j = \hat{\rho N}_j} = 0, \quad j = 1, 2, \ldots, m; \quad (7)$$

$$\left. \frac{\partial F_l}{\partial a_{ij}^{true}(t_q,t)} \right|_{a_{ij}^{true}(t_q,t) = \hat{a}_{ij}^{true}(t_q,t)} = 0, \quad i = 1, 2, \ldots, n; \quad (8)$$

$$j = 1, 2, \ldots, m$$

Figure 3:
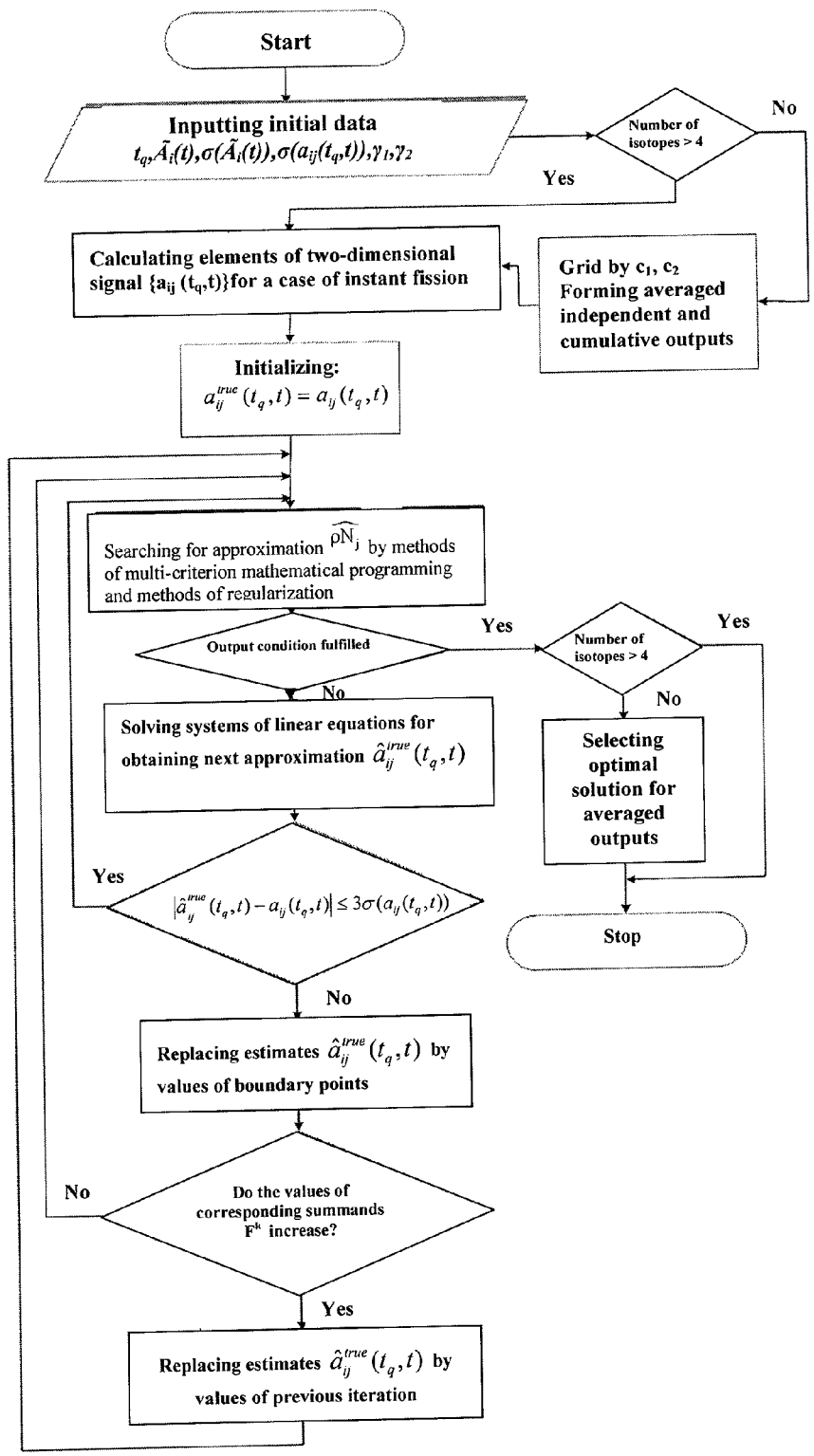
FIG. 3 shows a block diagram for finding a solution to poorly conditioned system of linear algebraic equations with the use of confluent analysis (corresponds to Block 1 of the general block diagram shown in FIG. 2).

A structure chart of the minimum signal (6) is shown in FIG. 3; it corresponds to Block 1 of the structure chart shown in FIG. 2.

In spite of linearity at a fixed $t_q$ in the equation systems (7)-(8), the task is incorrect from the point of calculations due to poor conditionality of the system (7). A relation between the maximum and minimum proper numbers in the matrix of the system (7) can be in the order of 1026. Therefore, in order to solve it, it is necessary to apply specific techniques, and in the claimed method these are methods of multi-criterion mathematical programming, wherein it is not required to determine a value for the regularization parameter, as in other methods for solving incorrect tasks.

As the first step at $\hat{a}_{ij}^{true}(t_q,t) = (t_q,t)$ the SLAE (7) is solved by methods of multi-criterion mathematical programming (a method for compressing an allowable value area, target programming) and the first approximation of the $(\widehat{\rho N}_j)_l$ estimate is found. In order to obtain estimates of true values $\hat{a}_{ij}^{true}(t_q,t)$ at a given value $t_q$, at each step of obtaining estimates $\widehat{\rho N}_j$, $j=1, 2, \ldots, m$ the condition (8) [3] is used, which results in additionally solving n systems of linear equations with m unknowns of the following type:

$$\sum_{r=1}^{m} \frac{(\rho \hat{N}_r)(\rho \hat{N}_v)}{\sigma^2(\tilde{A}_i(t))} \hat{a}_{ir}^{true}(t_q,t) + \frac{\hat{a}_{iv}^{true}(t_q,t)}{\sigma^2(a_{iv})} = \frac{a_{iv}(t_q,t)}{\sigma^2(a_{iv}(t_q,t))} + \frac{(\rho \hat{N}_v)\tilde{A}_i(t)}{\sigma^2(\tilde{A}_i(t))},$$

$$i = 1, 2, \ldots, n, \, v = 1, 2, \ldots, m.$$

The thus obtained value estimates should comply with the natural condition, i.e., belong to the uncertainty area of measured values $a_{ij}(t_q,t)$ $$|a_{ij}(t_q,t) - \hat{a}_{ij}^{true}(t_q,t)| \leq 3\sigma(q_{ij}(t_q,t)), \, i=1,2,\ldots,$$
$$n, \, j=1,2,\ldots,m.$$

If this condition is not met, then $\hat{a}_{ij}^{true}(t_q,t)$, $j=1, 2, \ldots, m$, which do not comply with this inequality, should be replaced by values of the nearest boundary points. Due to this, values of the signal $F_l$ may be increased on new constant values, as compared with those at the previous step of the iteration process, which will result in reducing the speed of iteration process convergence or in appearing oscillations.

In order values of the functional are not increased after recalculating estimates $\hat{a}_{ij}^{true}(t_q,t)$, $j=1, 2, \ldots, m$ the sets of estimates $\hat{a}_{ij}^{true}(t_q,t)$, $j=1, 2, \ldots, m$, for which the corresponding components of the functional $F_l$ are increased in comparison to their values at the previous iteration, should be replaced by the corresponding values for the previous step.

After adjusting estimates of true values $\hat{a}_{ij}^{true}(t_q,t)$, a next approximation $\widehat{\rho N}_j$ to solution for $\rho N_j$, $j=1, 2, \ldots, m$ is found by methods of multi-criterion mathematical programming instead of the regularization by A. N. Tikhonov, as is used in the analogous solution.

The criterion for stopping the algorithm is an insignificant difference between values of the signal $F_l$ and components of the vector $\rho N_j$ in adjacent iterations, i.e., fulfillment of the following inequalities:

$$\left\| \frac{(\rho \hat{N}_j)_l - (\rho \hat{N}_j)_{l-1}}{(\rho \hat{N}_j)_l} \right\| < \gamma_1, \quad (9)$$

$$\left| \frac{F_l - F_{l-1}}{F_l} \right| < \gamma_2,$$

where:

$(\widehat{\rho N}_j)_l$ is next approximation to a solution at the 1st iteration;

$\gamma_1$, $\gamma^2$ are some numbers (small decimal fractions, e.g., 0.001) defining the accuracy of calculating values for estimates of $\widehat{\rho N}_j$.

When solving by methods of multi-criterion mathematical programming:
1) a two-criterion task for mathematical programming is formed:

$$J_1 = \sum_{i=1}^{n} \left( \tilde{A}_i(t) - \sum_{j=1}^{m} a_{ij}^{true}(t_q, t)(\rho N_j) \right)^2 \to \min_{\rho N_j}, \quad (10)$$

$$J_2 = \sum_{j=1}^{m} \rho N_j \to \min_{\rho N_j},$$

with the limitations $\rho N_j \geq 0$, $j = \overline{1,m}$.

Here, $J_1$ is a signal regulating a sum of squares of discrepancies for the equation system of type (4), which ensures matching a solution estimate $\widehat{\rho N_j}$, $j = \overline{1,m}$ to measured activities of krypton and xenon isotopes; $J_2$ is a signal forming a solution type.

2) Using the threshold optimization method or target programming, the algorithm goes from the two-criterion task of mathematical programming (10) to a single-criterion task by means of transferring all the above functionals, except for one, to the limitation conditions.

The threshold optimization method (or the method of e-limitations) results in various possible combinations of target functions and limitations. The algorithm applies their following types:

$$\min_{\rho N_j} \sum_{i=1}^{n} \left( \tilde{A}_i(t) - \sum_{j=1}^{m} a_{ij}^{true}(t_q, t) \cdot (\rho N_j) \right)^2 \pi p \mathcal{H} \sum_{j=1}^{m} \rho N_j \leq \delta; \quad (11)$$

$$\rho N_j \geq 0, \ j = \overline{1, m};$$

$$\min_{\rho N_j} \sum_{j=1}^{m} \rho N_j \pi p \mathcal{H} \sum_{i=1}^{n} \left( \tilde{A}_i(t) - \sum_{j=1}^{m} a_{ij}^{true}(t_q, t) \cdot (\rho N_j) \right)^2 \leq \beta; \quad (12)$$

$$\rho N_j \geq 0, \ j = \overline{1, m}.$$

The task (11) is for quadratic programming, the task (12) is for non-linear programming.

Estimates of the right sides of the limitations $\delta$ and $\beta$ may be obtained at independent minimization of the functional J1 and J2 with the limitations $\rho N_j \geq 0$, $j = \overline{1,m}$. Here, any mathematical programming method may be used.

Target programming includes two solution models—the Archimedean model and the model with priorities.

If the Archimedean model is used, all target functions are transferred into limitations, and a weighed sum of their deviations from the limitations is minimized:

$$\min_{d_1, d_2} \{-(w_1 d_1 + w_2 d_2)\} \text{ at } J_1(\rho N_j) + d_1 \leq \beta, \quad (13)$$

$$J_2(\rho N_j) + d_2 \leq \delta,$$

where:
$w_i$ are weighting coefficients, $$\sum_{i=1}^{2} w_i = 1;$$

$d_i$ are deviations from limitations.

If the model with priorities is used, target functions are successively transferred to limitations, and deviations of target function values from limitations are minimized. Here a deviation value $d_i$, as found in this step, is used as an optimal deviation in the next step i+1:

$$\text{step 1: } \min_{d_1}(-d_1) \text{ at } J_1(\rho N_j) + d_1 \leq \beta; \quad (14)$$

$$\text{step 2: } \min_{d_2}(-d_2) \text{ at } J_1(\rho N_j) + d_{1onm}|_{d_{1onm}=d_1} \leq \beta,$$

$$J_2(\rho N_j) + d_2 \leq \delta.$$

For identifying a nuclear explosion by a small number of xenon isotopes the fact is used that output of such isotopes poorly depends on neutron energies.

Figure 4:
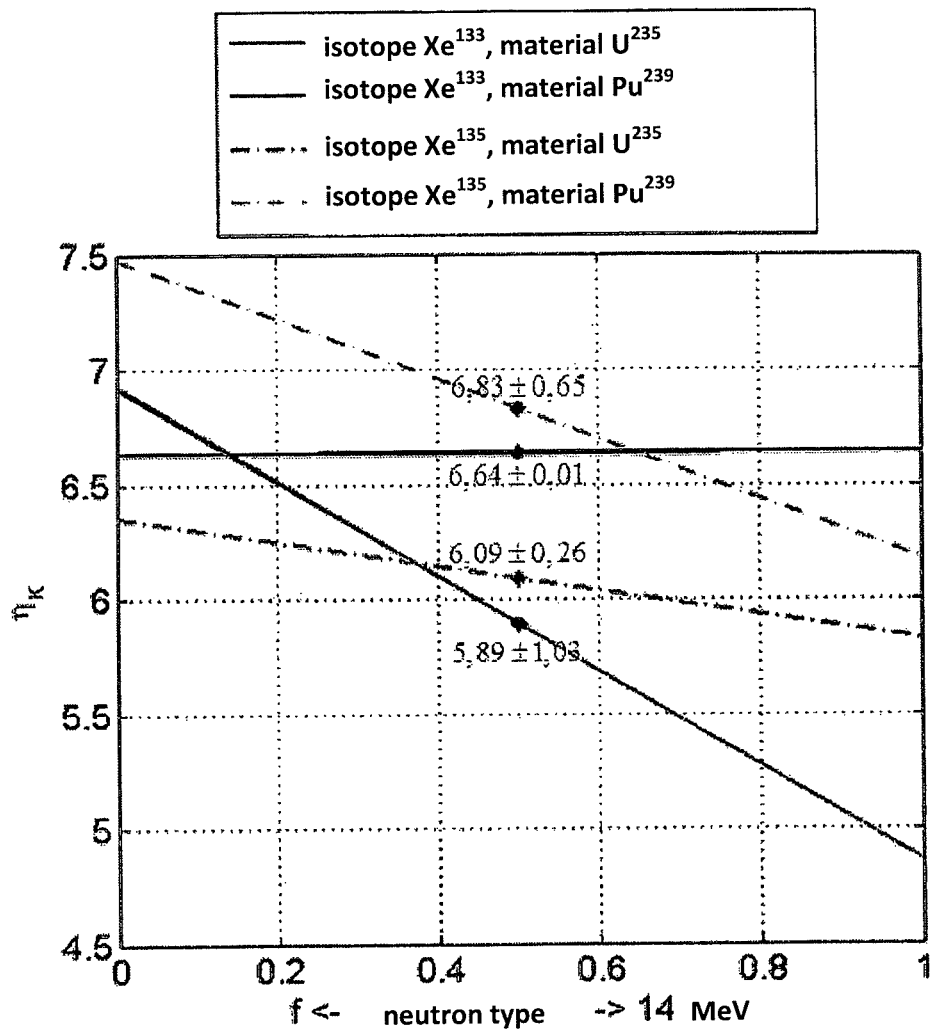
FIG. 4 shows a plot of dependence of cumulative outputs of isotopes $Xe^{133}$ and $Xe^{135}$ on relative contribution of fission spectrum neutrons and neutrons with energy of 14 MeV.

This is illustrated in FIG. 4 that shows plots of averaged cumulative outputs of isotopes Xe133 and Xe135, depending on proportions of cumulative outputs corresponding to fission spectrum neutrons and neutrons with energy of 14 MeV. It is known that cumulative outputs have errors up to 5%.

It can be seen in FIG. 4 that averaged output values (values corresponding to equal proportions of fission spectrum neutrons and neutrons with energy of 14 MeV are shown as examples) are within these errors.

Combinations of two $U^{235}$ fission types (by fission spectrum neutrons and neutrons with energy of 14 MeV) into one fission type and of two Pu239 fission types (by fission spectrum neutrons and neutrons with energy of 14 MeV) into one fission type are used for identifying by 2-4 measured isotopes, which results in reducing the number of identifiable fission types (two instead of four).

Here, specific activity is calculated as follows:
1) for fissionable $U^{235}$—according to the formula (2) with the independent output vector $\eta^{U_f^{235}} = c_1 \theta^{U_f^{235}} + (1 - c_1) \eta^{U_{14}235}$, where $\eta^{U_f235}$ and $\eta^{U_{14}235}$ are independent outputs of elements of isobaric chains when $U^{235}$ is fissioned by fission spectrum neutrons and neutrons with energy of 14 MeV, respectively; $c_1$ is the parameter for taking into account a proportion of independent outputs $\eta^{U_f^{235}}$ and $\eta^{U_{14}235}$ in their sum $c_1 \in [0,1]$.

2) for fissionable $Pu^{239}$—according to the formula (2) with the independent output vector $\eta^{Pu_f^{239}} = c_2 \eta^{Pu_f239} + (1 - c_2) \eta^{Pu_{14}}$, where $\eta^{Pu_f^{239}}$ and $\eta^{Pu_{14}}$ are independent outputs of elements of isobaric chains when $Pu^{239}$ is fissioned by fission spectrum neutrons and neutrons with energy of 14 MeV, respectively; $c_2$ is the parameter for taking into account a proportion of independent outputs $\eta^{Pu_f^{239}}$ and $\eta^{Pu_{14}239}$ in their sum $c_2 \lceil [0,1]$.

After setting by $c_1$ and $c_2$ a two-dimensional grid with the pitches $\Delta c_1$ and $\Delta c_2$, respectively, and finding the signal minimum (6) for different $c_1$ and $c_2$, contributions of sources $\rho N^{U^{235}}$ and $\rho N^{Pu^{239}}$ to the total activity of krypton and xenon isotopes, at which a sum of squares of the system (2) discrepancies is minimum, are taken as true.

Thus, the proposed method for identifying parameters of a nuclear explosion can be carried out as follows:
1. Activities $\tilde{A}_i(t)$ of individual krypton and xenon isotopes ($Kr^{83m}$, $Kr^{85m}$, $Kr^{85}$, $Kr^{88}$, $Xe^{131m}$, $Xe^{133m}$, $Xe^{133}$, $Xe^{135}$) are measured in the atmosphere (t is measurement time), where $i = \overline{1,n}$, n is the number of measured isotopes.

2. Dependencies of isotope activity relations on time are built with no account taken of separation from the appearance time of an event (nuclear explosion) to the time of measuring activities $\tilde{A}_i(t)$ of krypton and xenon isotopes (for example, $Kr^{85m}/Xe^{135}$) for different types of fissionable materials ($U_f^{235}$, $U_{14}^{235}$, $Pu_f^{239}$, $Pu_{14}^{239}$).

3. Relations of isotopes (for example, $Kr^{85m}/Xe^{135}$) are determined in "reverse time" from measured experimental points until they match relative activity values for the same isotopes with no account taken of separation.

4. A time interval $[t_H, t_K]$ is determined by matching values, in which the krypton and xenon isotopes separated from their predecessors along isobaric chains of radioactive transformations.

5. A time grid with the pitch $\Delta t$ is set in the interval $[t_H, t_K]$.

6. A two-dimensional signal of specific activities of krypton and xenon isotopes is formed and memorized for each node of the grid $$\left\{ a_{ij}(t_q, t) = \left\{ \begin{array}{ll} a_{ij}(t) & \pi p \mathit{M} t < t_q, \\ a_{ij}^{t_q}(t_q, t) & \pi p \mathit{M} t > t_q, \end{array} \right\}, i = \overline{1,n}, j = \overline{1,m} \right.$$

wherein lines correspond to particular isotopes and columns correspond to particular fission types; in is a number of considered fission types. Here $a_{ij}(t)$ corresponds to the specific activity value of i-isotope for j-type of fission, which activity is calculated until the separation time $t_q$ according to the formula (2), and $a_{ij}^{t_q}(t_q,t)$ is calculated at the time t exceeding the separation time $t_q$ according to the formula (3).

7. Considering that the measured activity values $\tilde{A}_i(t)$ and the elements of the two-dimensional signal $\{a_{ij}(t_q,t)\}$ are statistically independent quantities distributed according to the normal law with mathematical expectations $\tilde{A}_i^{true}(t)$ and $a_{ij}^{true}(t_q,t)$ and mean square deviations $\sigma(\tilde{A}_i(t))$ and $\sigma(a_{ij}(t_q,t))$, respectively, a one-dimensional signal $F_l$ is formed according to the formula (6).

8. Numbers $\gamma_1, \gamma_2$, which characterize accuracy of estimating $\widehat{\rho N_j}$ and $\hat{a}_{ij}^{true}(t_q,t)$ are set.

9. A two-criterion task for mathematical programming $$J_1 = \sum_{i=1}^{n} \left( \tilde{A}_i(t) - \sum_{j=1}^{m} a_{ij}^{true}(t_q, t) \cdot (\rho N_j) \right)^2 \to \min_{\rho N_j},$$

$$J_2 = \sum_{j=1}^{m} \rho N_j \to \min_{\rho N_j},$$

is formed in the first iteration, taking $a_{ij}^{true}(t_q,t) = a_{ij}(t_q,t)$ (and in the following iterations $a_{ij}^{true}(t_q,t) = \hat{a}_{ij}^{true}(t_q,t)$) with the limitations $\rho N_j \geq 0, j = \overline{1,m}$.

10. Using the method for compressing allowable value area or target programming, the algorithm goes from the mathematical programming two-criterion task according to the formulae (11)-(14) to a one-criterion task by means of transferring all the above functionals, except for one, to the limitation conditions.

11. Using methods of quadratic programming, non-linear programming, target programming (the Archimedean model and the model with priorities), the first approximation $(\widehat{\rho N_j})_l$ of estimated activity contributions of individual sources to the total activity.

12. After obtaining the first approximation $(\widehat{\rho N_j})_l$, the elements of the two-dimensional signal $\{a_{ij}(t_q,t)\}$ are specified more precisely. For this, n systems of linear equations with in unknowns are solved:

$$\sum_{r=1}^{m} \frac{(\rho N_r)(\rho N_r)}{\sigma^2(\tilde{A}_i(t))} \hat{a}_{ir}^{true}(t_q, t) + \frac{\hat{a}_{iv}^{true}(t_q, t)}{\sigma^2(a_{iv}(t_q, t))} = \frac{a_{iv}(t_q, t)}{\sigma^2(a_{iv}(t_q, t))} + \frac{(\rho N_v)\tilde{A}_i(t)}{\sigma^2(\tilde{A}_i(t))},$$

$$i = 1, 2, \ldots, n, v = 1, 2, \ldots, m,$$

where the estimate approximation $(\widehat{\rho N_j})_l$ found in the first iteration is substituted for $(\rho N_j)$.

13. Then the algorithm checks whether the new values $\hat{a}_{ij}^{true}(t_q,t)$ satisfy the (natural area of uncertainty of the elements $a_{ij}(t_q,t)$:

$$|a_{ij}(t_j,t) - \hat{a}_{ij}^{true}(t_q,t)| \leq 3\sigma(a_{ij}(t_q,t)), i=1,2,\ldots,$$
$$n, j=1,2,\ldots,m.$$

If this condition is not met, then $\hat{a}_{ij}^{true}(t_q,t), j=1, 2, \ldots, m$, which do not satisfy this inequality, are replaced by values of the nearest boundary points.

Due to this, values of the signal $F_l$ may be greater on new values of variables $\hat{a}_{ij}^{true}(t_q,t)$ in comparison to the previous step of the iteration process, which results in reducing the speed of convergence of the iteration process and appearing oscillations.

In order values of the signal $F_l$ are not increased after recalculating estimates $\hat{a}_{ij}^{true}(t_q,t), j=1, 2, \ldots, m$, the sets of estimates $\hat{a}_{ij}^{true}(t_q,t), j=1, 2, \ldots, m$, for which the corresponding components of the functional $F_l$ are increased in comparison to their values at the previous iteration, should be replaced by the corresponding values for the previous step.

14. The operations mentioned in Items 9-13 should be repeated until the following conditions are met:

$$\left\| \frac{(\rho \hat{N}_j)_l - (\rho \hat{N}_j)_{l-1}}{(\rho \hat{N}_j)_l} \right\| < \gamma_1,$$

$$\left| \frac{F_l - F_{l-1}}{F_l} \right| < \gamma_2,$$

15. For identifying a nuclear explosion by a small number of isotopes (2-4 isotopes) a two-dimensional grid is set over $c_1$ and $c_2$ with the pitches $\Delta c_1$ and $\Delta c_2$, respectively, where $c_1$ and $c_2$ are weights for summing up the independent and cumulative outputs of the RTIC elements.

16. Vectors of independent outputs $\eta^{U235} = c_1 \eta^{U_f^{235}} + (1-c_1) \eta^{U_{14}235}$ and $\eta^{Pu239} = c_2 \eta^{Pu_f239} + (1-c_2) \eta^{Pu_{14}239}$ are calculated for each value of $c_1$ and $c_2$.

17. A two-dimensional signal of specific activity calculated and memorized for each pair of the vectors $\eta^{U235}$ and $\eta^{Pu239}$.

18. The operations mentioned in Items 6-13 are performed for each two-dimensional signal, until the condition from Item 14 is met.

19. Among the signal estimates $(\widehat{\rho N_j})_{c_1 c_2}$, which are found after solving the task of identifying a nuclear explosion, at the corresponding two-dimensional signal $\{a_{ij}(t_q,t)\}_{c_1 c_2}$, that estimate is selected at which a value of $$\sum_{i=1}^{n} \left( \tilde{A}_i(t) - \sum_{j=1}^{m} (a_{ij}^{true}(t_q, t))_{c_1 c_2} (\rho \hat{N}_j)_{c_1 c_2} \right)^2$$

is minimal.

20. As the separation time tq is taken at which the relation $$\sum_{i=1}^{n} \left( \tilde{A}_i(t) - \sum_{j=1}^{m} \hat{a}_{ij}^{true}(t_q, t)(\rho \hat{N}_j) \right)^2 \Big/ \sum_{j=1}^{m} (\rho \hat{N}_j)^2$$

is minimal.

Shown in the general block diagram of the algorithm (FIG. 2), Block "Introducing separation interval $[t_H, t_K]$ and pitch $\Delta t$ within this interval" corresponds to Items 4, 5; Block "Minimizing signal $f_i(t_q, \widehat{\rho N_j}, \hat{a}_{ij}^{true})$ by $t_q$ corresponds to Item 20.

The main part of the algorithm is put into Block 1 "Searching estimates for $\widehat{\rho N}_j, \hat{a}_{ij}^{true}$" which diagram is shown in FIG. 3.

Block "Input of initial data $t_q, \tilde{A}_i(t), \sigma(\tilde{A}_i(t)), \sigma(a_{ij}(t_{ij},t)), \gamma_1, \gamma_2$ corresponds to Items 1, 7, 8 of the method;

Block "Calculation of elements of two-dimensional signal $\{a_{ij}(t_q,t)\}$ for case of instant fission" corresponds to Items 6, 17 of the method;

Block "Grid by $c_1$ and $c_2$. Forming averaged independent and cumulative outputs" corresponds to Items 15, 16 of the method;

Block "Initializing $\hat{a}_{ij}^{true}(t_q,t)=a_{ij}(t_q,t)$" corresponds to Item 9 of the method. The operations mentioned in Items 9-11 of the method are performed in Block "Searching for $\widehat{\rho N}_j$ approximation by methods of multi-criterion mathematical programming";

Block "Solving systems of linear equations for obtaining next $\hat{a}_{ij}^{true}(t_q,t)$ approximation realizes Item 12, and Blocks "$|\hat{a}_{ij}^{true}(t_q,t)-a_{ij}(t_q,t)|\leq 3\sigma(a_{ij}(t_q,t))$", "Replacing estimates $\hat{a}_{ij}^{true}(t_q,t)$ by boundary point values", "Replacing estimates $\hat{a}_{ij}^{true}(t_q,t)$ by values of previous iteration" and the conditions binding them correspond to Item 13 of the method.

Block "Output condition met" realizes Item 14 of the method, and Block "Selecting optimal solution for averaged outputs" realizes Item 19.

INDUSTRIAL APPLICABILITY OF THE PROPOSED METHOD

Implementation of the proposed method was simulated on a personal computer having 2.4 GHz Intel Celeron processor, RAM 768 MB and the Matlab 7.0 mathematical package.

The simulation was directed to a situation of sample taking 6 days after an explosion and to measuring activities of 5 isotopes ($Kr^{85m}, Xe^{131m}, Xe^{133m}, Xe^{133}, Xe^{135}$). Results were calculated on the condition that separation time is supposed to be known and equal to 3 hours after the event.

Values of measured activities were additively "made noisy" with Gaussian noise with root-mean-square deviation equal to 5% of their "true" value.

The following combinations of fission types (possible sets of $\rho N_j$ variables):
1) $U_{th}^{235}+Xe^{133}$ background (two unknown sources);
2) $U_{th}^{235}+U_f^{235}+U_{14}^{235}$ (three unknown sources);
3) $U_{th}^{235}+Pu_f^{239}+Pu_{14}^{239}$ (three unknown sources);
4) $U_f^{235}+U_{14}^{235}$ (two unknown sources);
5) $U_f^{235}+U_{14}^{235}+Xe^{133}$ background (three unknown sources);
6) $Pu_f^{239}+Pu_{14}^{239}$ (two unknown sources);
7) $Pu_f^{239}+Pu_{14}^{239}+Xe^{133}$ background (three unknown sources);
8) $U_f^{235}+U_{14}^{235}+Pu_f^{239}+Pu_{14}^{239}$ (four unknown sources);
9) $U_f^{235}+U_{14}^{235}+Pu_f^{239}+Pu_{14}^{239}+Xe^{133}$ background (five unknown sources), where $U_{th}^{235}$ is reactor emission (data on reactors is taken from literature).

The true solution is the combination 4, the relative contribution of $U_f^{235}$ is 100, the relative contribution of $U_{14}^{235}$ is 100. The simulation results are shown in Table 1.

The line "Method for solving" states 4 methods for solving the task of identifying a nuclear explosion (quadratic programming, non-linear programming, Archimedean model, model with priorities), as proposed in this method, which were compared to the solving method that is used in the analogous algorithm (Tiknonov's regularization).

The line "Number of fission type combination" indicates the number of fission type combination that ensures the least sum of squares of discrepancies in the equation system (4) for corresponding solving methods (Tikhonov's regularization, methods of multi-criterion mathematical programming) from the 9 combinations in total.

The line "Order of conditionality number for system matrix" indicates orders of conditionality numbers for the matrix of the system (4), as corresponds to the fission type combination indicated in the second line.

The line "Solution estimate" indicates estimates for fission type contributions present in fission type combinations indicated in the second line. For example, the combination 2 is the best for the Tikhonov's regularization from the point of the sum of discrepancy squares. Three fission types correspond to this combination: $U_{th}^{235}$, which calculated relative contribution is 35.99; $U_f^{235}$, which calculated relative contribution is 42.97, and $U_{14}^{235}$, which calculated relative contribution is 110.27. The same applies to the other solving methods also.

The line "Sum of discrepancy squares" indicates values of discrepancy square sum for the equation system (4), which are calculated for fission type combinations and their estimated contributions to the total activity of the krypton and xenon isotopes.

The line "Time of using algorithm, min" indicates time in minutes required for obtaining contribution estimates by the respective method.

TABLE 1

Results of solving the identification task by various methods (radioactivity source are $U_{235}^f$ and $U_{235}^{14}$, true solution is 100 and 100)

| Solving method | Tikhonov's regularization | Quadratic programming | Non-linear programming | Archimedean model | Model with priorities |
|---|---|---|---|---|---|
| Number of fission type combination | 2 | 9 | 9 | 9 | 9 |
| Order of conditionally number for system matrix | $10^6$ | $10^{14}$ | $10^{14}$ | $10^{14}$ | $10^{14}$ |
| Solution estimate | 35.99 | 84.94 | 43.53 | 84.94 | 84.94 |
| | 42.97 | 108.18 | 120.76 | 108.18 | 108.18 |
| | 110.27 | 0.00 | 0.00 | 0.00 | 0.00 |
| | | | 0.00 | 0.00 | 0.00 | 0.00 |
| | | | 10.99 | 0.00 | 10.98 | 10.99 |
| | | | 0.00 | 0.00 | 0.00 | 0.00 |
| Sum of discrepancy squares | 751.39 | 74.97 | 5096.43 | 74.97 | 74.97 |
| Time of using algorithm, min | 1.46 | 9.28 | 11.95 | 13.40 | 19.78 |

It can be seen in Table 1 that the Tikhonov's regularization method gives a negative result, the solution comprises significant relative contribution of a nuclear reactor (the true solution lacks it).

A positive solution is obtained by the methods of multi-criterion programming (quadratic, non-linear, target programming (Archimedean model and model with priorities)), when the additional condition of non-negativity of variables is used.

The optimal result corresponds to the ninth combination of fission types. This does not contradict to the true solution, since contributions of those fission types that are not present in the true solution are insignificant (most of them are zero).

Thus, the advantages of the proposed method are:

Increased efficiency and accuracy of identification of nuclear explosion parameters due to: simultaneously checking various fission type combinations by methods of multi-criterion mathematical programming, which do not require calculation of the regularization parameter, using additional limitations applied to a solution and corresponding the task physical statement (non-negativity, boundedness of solution), using different target functions simultaneously and combining two fission types of one material by neutrons from two energy groups into a single fission type, i.e., reducing the number of unknowns in equation systems.

What is claimed is:

1. A non-transitory computer readable medium performing a system implemented method, the method comprising the steps for identifying a nuclear explosion by radioactive isotopes of krypton and xenon by measuring, at time t after an event, signals $\tilde{A}_i(t)$ describing a change in total activity of each isotope in the atmosphere near a measuring station; building relations between isotope activities and time with no account taken of separation and relations of isotope activities drawn from measured points in reverse time for all fission types under consideration; determining a separation interval $[t_H, t_K]$; setting a time grid within the separation interval $[t_H, t_K]$; forming fission type combinations; calculating $t_q$ for each grid node within the separation interval and for each combination a two-dimensional signal A describing values of "specific" activities of each isotope against the separation time $t_q$ and measuring time t and potential source (of fissionable material and neutron energy); setting root-mean-square values $\sigma(\tilde{A}_i(t))$ for errors in measured signals $\tilde{A}_i(t)$ and errors $\sigma(a_{ij}(t_q, t))$ in the two-dimensional signal elements $\{a_{ij}(tq,t)\}$; setting quantities $\gamma 1, \gamma_2$ defining accuracy of signal estimates $\widehat{\rho N_j}$; identifying a nuclear explosion by means of forming a signal $J_1$ defining accuracy of a solution, which is obtained from a sum of squares of difference between signals $\tilde{A}_i(t)$ and products obtained by multiplying lines of a two-dimensional signal $\{a_{ij}(tq,t)\}$ by values of $\widehat{\rho N_j}$ signals, and a signal $J_2$ defining a type of a $\widehat{\rho N_j}$ signal; forming limitation signals and a target signal (target function) from the signals $J_1$ and $J_2$ in the set combinations; and finding, with the use of an iteration process and subject to specifying at each iteration, two-dimensional signal values $\{a_{ij}(tq,t)\}$ for elements of the $\rho N_j$ signal; determining, according to the elements of the $\widehat{\rho N_j}$ signal, point estimates for activity contributions of each possible fission type to total activity; selecting an optimal combination of fission types according to a sum of discrepancy squares; and determining whether a nuclear explosion by radioactive isotopes of krypton and xenon has been identified.

2. A method according to claim 1, characterized by combining two types of fission of $U^{235}$ and $Pu^{239}$ by neutrons of different energy groups into one fission type $\eta^{U235}$ and $\eta^{Pu239}$, respectively, by summing up with weights of independent and cumulative outputs of isobaric chain elements corresponding to different fission types; forming a two-dimensional grid by weights $c_1$ and $c_2$; calculating, for each pair of weights $(c_1, c_2)$, elements of a two-dimensional signal of specific activity $\{a_{ij}(tq,t)\}_{c_1 c_2}$; calculating, according to claim 1, estimates for signals $(\widehat{\rho N_j})_{c_1 c_2}$; selecting a $(\widehat{\rho N_j})_{c_1 c_2}$ estimate for which a value of $$\sum_{i=1}^{n} \left( \tilde{A}_i(t) - \sum_{j=1}^{m} (a_{ij}^{true}(t_q, t))_{c_1 c_2} (\rho \hat{N}_j)_{c_1 c_2} \right)^2$$

is minimal.

* * * * *